US009754007B2

(12) United States Patent
Jacobs et al.

(10) Patent No.: US 9,754,007 B2
(45) Date of Patent: *Sep. 5, 2017

(54) CHECKPOINT CAPTURE AND TRACKING IN A HIGH AVAILABILITY SYSTEM (71) Applicant: International Business Machines Corporation, Armonk, NY (US)

(72) Inventors: Stuart Z. Jacobs, Lakeville, MN (US); David A. Larson, Rochester, MN (US); Kyle A. Lucke, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/027,795

(22) Filed: Sep. 16, 2013

(65) Prior Publication Data
US 2015/0082087 A1    Mar. 19, 2015

(51) Int. Cl.
G06F 11/14    (2006.01)
G06F 17/30    (2006.01)
G06F 11/20    (2006.01)

(52) U.S. Cl.
CPC .... G06F 17/30584 (2013.01); G06F 11/1407 (2013.01); G06F 11/1484 (2013.01); *G06F 11/1443* (2013.01); *G06F 11/2038* (2013.01); *G06F 11/2097* (2013.01)

(58) Field of Classification Search
CPC .......... G06F 11/1407; G06F 17/30584; G06F 11/2097; G06F 11/1484; G06F 11/2038; G06F 11/1443
See application file for complete search history.

(56) References Cited

U.S. PATENT DOCUMENTS

| 5,301,309 | A | 4/1994 | Sugano |
| 5,778,388 | A | 7/1998 | Kawamura et al. |
| 5,802,267 | A | 9/1998 | Shirakihara et al. |
| 6,622,263 | B1 | 9/2003 | Stiffler et al. |
| 7,840,768 | B2 | 11/2010 | Stiffler et al. |
| 2006/0025149 | A1* | 2/2006 | Karaoguz .......... H04N 21/4126 455/452.2 |

(Continued)

OTHER PUBLICATIONS

Jacobs, S., et al., "Failover Detection and Treatment in Checkpoint Systems," U.S. Appl. No. 14/043,244, filed Oct. 1, 2013

(Continued)

*Primary Examiner* — David X Yi
*Assistant Examiner* — Zubair Ahmed
(74) *Attorney, Agent, or Firm* — Jay Wahlquist (57) ABSTRACT

The present disclosure includes a method for transferring checkpoint information of a primary virtual machine from a primary host to a secondary host that includes, by the primary host, capturing checkpoint information from the primary virtual machine to a primary holding buffer on the primary host, generating a first number of partition state records from the checkpoint information, transmitting the first number of partition state records to the secondary host, receiving acknowledgements from the secondary host for a second number of partition state records, and tracking the second number of partition state records acknowledged by the secondary host.

7 Claims, 5 Drawing Sheets

(56) References Cited

U.S. PATENT DOCUMENTS

| | | | |
|---|---|---|---|
| 2008/0225703 A1* | 9/2008 | Rider | H04L 1/1803 370/229 |
| 2010/0037096 A1 | 2/2010 | Bum et al. | |
| 2011/0167195 A1* | 7/2011 | Scales | G06F 9/45558 711/6 |
| 2011/0208908 A1* | 8/2011 | Chou | G06F 11/1662 711/112 |
| 2012/0303576 A1 | 11/2012 | Calder et al. | |
| 2013/0198557 A1 | 8/2013 | Bensinger | |
| 2014/0359607 A1* | 12/2014 | Tsirkin | G06F 9/48 718/1 |

OTHER PUBLICATIONS

Larson, D., "Virtual Machine Suspension in Checkpoint System," U.S. Appl. No. 14/026,533, filed Sep. 13, 2013.

Bailey et al., "IBM PowerVM Live Partition Mobility", IBM RedBooks, International Technical Support Organization, Mar. 2009, Second Edition, © Copyright International Business Machines Corporation 2007, 2009.

Bowen et al., "Virtual Checkpoints: Architecture and Performance", IEEE Transactions on Computers, vol. 41, Issue 5, pp. 516-525, 1992, (Manuscript received Jun. 24, 1991, Revised Dec. 4, 1991), © 1992 IEEE. DOI: 10.1109/12.142677.

Cabillic et al., "The Performance of Consistent Checkpointing in Distributed Shared Memory Systems", Proceedings: 14th Symposium on Reliable Distributed Systems, 1995, pp. 96-105, © 1995 IEEE. DOI: 10.1109/RELDIS.1995.526217.

Elnozahy et al., "The Performance of Consistent Checkpointing", Proceedings: 11th Symposium on Reliable Distributed Systems, 1992, pp. 39-47, © 1992 IEEE. DOI: 10.1109\RELDIS.1992.235144.

Elnozahy et al., "A Survey of Rollback-Recovery Protocols in Message-Passing Systems", ACM Computing Surveys (CSUR), vol. 34, Issue 3, Sep. 2002, pp. 375-408, ACM New York, NY. DOI: 10.1145/568522.56825.

Hitachi, "Synchronous Data Replication", Hitachi Solutions Brief, pp. 1-8, © 2007 Hitachi Data Systems.

IBM, "z/VM Single System Image Overview", © 2013 IBM Corporation. http://www.vm.ibm.com/ssi.

Kingsley et al., "Compiler-Assisted Checkpoint Optimization Using SUIF", Paper Submitted to First SUIF Compiler Workshop, Nov. 15, 1995, pp. 1-16. DOI: 10.1.1.31.1300.

Li et al., "Real-Time, Concurrent Checkpoint for Parallel Programs", PPOPP '90: Proceedings of the second ACM SIGPLAN symposium on principles & practice of parallel programming, Feb. 1990, pp. 79-88, ACM New York, NY © 1990. DOI: 10.1145/99163.99173.

Microsoft, "Deployment Guidelines for Exchange Server Multi-Server Data Replication", Microsoft Exchange Server, last modified Sep. 1, 2006, Accessed Dec. 23, 2012.

Plank et al, "Libckpt: Transparent Checkpointing Under Unix", TCON '95: Proceedings of the USENIX Winter 1995 Technical Conference Proceedings, Jan. 1995.

Plank et al., "Diskless Checkpointing", Technical Report UT-CS-97-380, University of Tennessee, Dec. 17, 1997, pp. 1-30.

Red Hat, "Virtualization Administration Guide, Chapter 4: KVM live migration", Red Hat Customer Portal, © 2012 Red Hat, Inc. https://access.redhat.com/knowledge/docs/en-US/Red_Hat_Enterprise_Linux/6/html/Virtualization_Administration_Guide/.

Wilson et al., "Demonic Memory for Process Histories", PLDI '89: Proceedings of the ACM SIGPLAN 1989 Conference on Programming language and design and implementation, Jul. 1989, pp. 330-343, ACM New York, NY © 1989. DOI: 10.1145/73141.74898.

* cited by examiner

CHECKPOINT CAPTURE AND TRACKING IN A HIGH AVAILABILITY SYSTEM

FIELD

This disclosure relates to checkpoint-based high availability systems. In particular, it relates to storing and tracking checkpoint information in a checkpoint-based high availability system.

BACKGROUND

Virtualization involves creation of an abstracted system on a hardware platform. A hypervisor creates one or more virtual machines on a computer system and manages resource, memory, and device allocation for the virtual machines. The hypervisor may be installed directly on the hardware or may be installed on a host operating system. Each virtual machine has abstracted components such as a processor, memory, and I/O devices, as well as an installed guest operating system.

Virtual machines often perform parallel tasks and are managed with regard to the tasks. A virtual machine may fail due to hardware failure, firmware failure, power loss, or other casualty that interrupts operation of the virtualized system. High availability is the concept of maintaining service of virtual components in the event of such a failure.

SUMMARY

The present disclosure includes a method for transferring checkpoint information of a primary virtual machine during a checkpoint from a primary host to a secondary host, comprising, by the primary host, capturing the checkpoint information from the primary virtual machine to a primary holding buffer on the primary host, generating a first number of partition state records from the checkpoint information, transmitting the first number of partition state records to the secondary host, receiving acknowledgements from the secondary host for a second number of partition state records, and tracking the second number of partition state records acknowledged by the secondary host.

The present disclosure includes a method of performing a checkpoint on a high availability system that includes, by a primary host, suspending execution of a primary virtual machine on the primary host, capturing checkpoint information of the primary virtual machine to a primary holding buffer on the primary host, resuming execution of the primary virtual machine, generating a first partition state record and a second partition state record from the checkpoint information, wherein each partition state record has an associated sequence number, and transmitting the first partition state record along a first pathway to a first secondary host.

The present disclosure also includes a high availability system containing a primary host, one or more secondary hosts, and a network connecting the primary and secondary hosts. The primary host contains a primary hypervisor, a primary virtual machine abstracted by the primary hypervisor, a primary holding buffer, and a primary checkpoint module. The primary holding buffer is configured to store checkpoint information from the primary virtual machine. The primary checkpoint module is configured to generate the partition state records from the checkpoint information, transmit the partition state records to the secondary host, and track transmission and acknowledgement of the partition state records. Each secondary host contains a secondary hypervisor, a secondary virtual machine abstracted by the secondary hypervisor, a secondary holding buffer, and a secondary checkpoint module. The secondary holding buffer is configured to store partition state records received from the primary host. The secondary checkpoint module is configured to receive the partition state records from the secondary host and transmit acknowledgements of the partition state records to the primary host.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

High availability data processing systems are typically designed with redundant and synchronous architecture. One method of redundancy and synchronization for high availability data processing systems involves checkpoint-based high availability. In checkpoint-based high availability, a host machine (primary host) running a virtual machine performs a checkpoint on the virtual machine at a scheduled time or event occurrence. The checkpoint mirrors the virtual machine of the primary host to another virtual machine maintained on a different host machine (secondary host). By maintaining a ready copy of the virtual machine on a separate system, system control and execution can be shifted to the secondary host in the event of failure of the primary host with less interruption.

Figure 1:
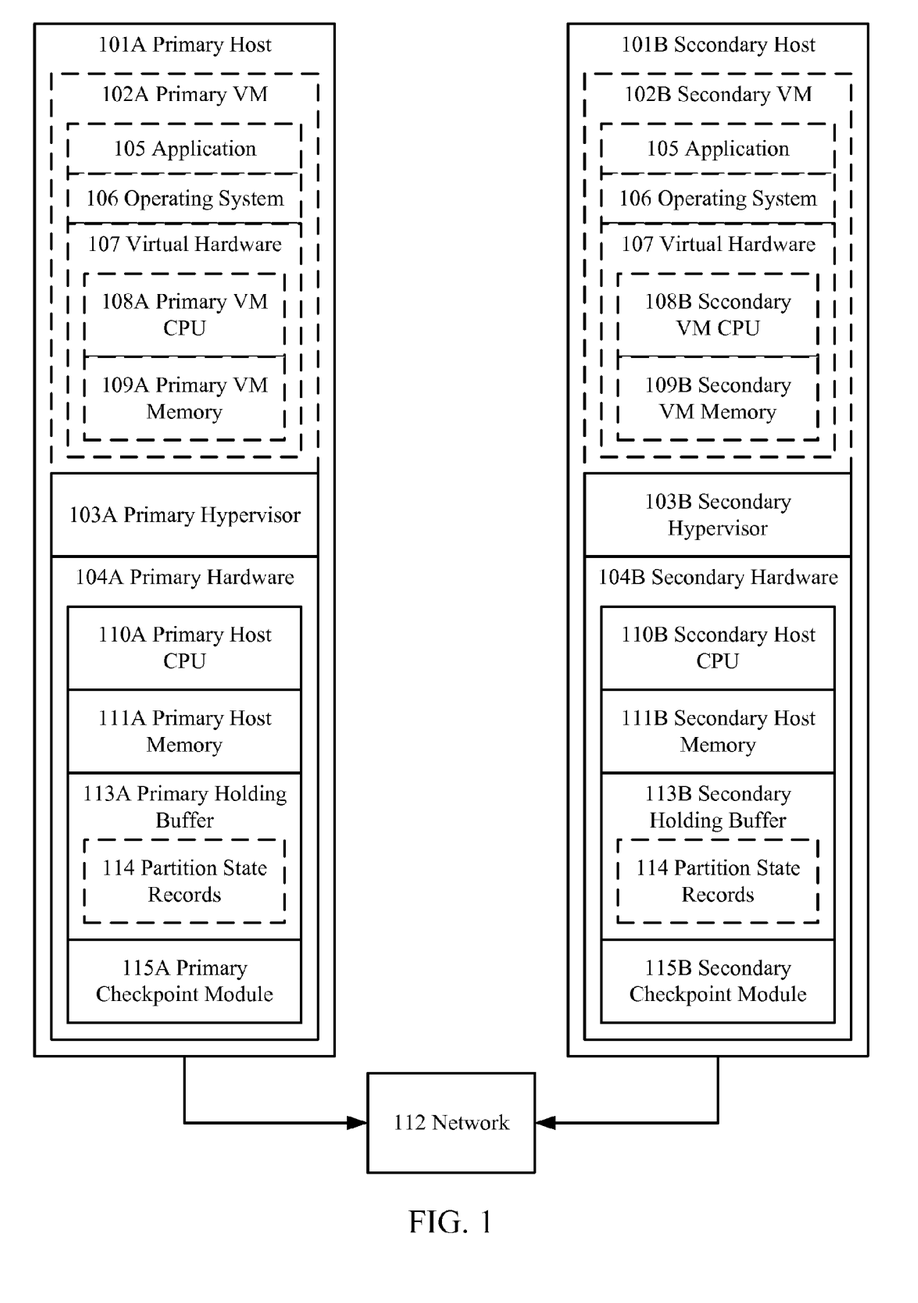
FIG. 1 is a diagram of physical and virtual aspects of a high availability checkpoint system utilizing two hosts running mirrored virtual machines, according to embodiments of the invention.

FIG. 1 is a diagram of physical (solid line) and virtual (dotted line) aspects of a high availability checkpoint system embodiment utilizing two hosts running mirrored virtual machines, according to embodiments of the disclosure. A primary host 101A contains a primary hypervisor 103A that abstracts one ore more primary virtual machines 102A (only one shown for clarity) from primary hardware 104A of the primary host 101A. A secondary host 101B contains a secondary hypervisor 103B that abstracts one ore more secondary virtual machines 102B (only one shown for clarity) from secondary hardware 104B of the secondary host 101B. Each virtual machine 102 may include applications 105, an operating system 106, and virtual hardware 107. The virtual hardware 107 may include VM CPU 108 and VM memory 109 resources, abstracted from host CPU 110 and host memory 111 resources on the host system hardware 104. Also on the primary hardware 104A is a primary holding buffer 113A having partition state records 114 and a primary checkpoint module 115A, while on the secondary hardware is a secondary holding buffer 113B having partition state records 114 and a secondary checkpoint module 115B. The primary host 101A and secondary host 101B may be in communication with each other through a network 112 containing one or more communication pathways (not shown).

The checkpoint process involves the primary host 101A tracking changes to CPU state and updates to memory pages, virtual I/O traffic, and partition events of the primary virtual machine 102A and sending those changes and updates to the secondary host 101B. Once checkpoint information is captured, the checkpoint information may be transmitted over a network 112 to the secondary host(s) 101B and stored on the secondary host(s) 101B until all checkpoint information has been received. This checkpoint process ensures that the checkpoint information is captured from the primary virtual machine 102A before returning to regular operation and that the checkpoint information is received by a secondary host 101B before the secondary host 101B updates its secondary virtual machine 102B with the latest checkpoint information. If the secondary host 101B receives a failure condition or signal from the primary hypervisor 103A, the secondary host 101B may take over storage and network traffic and begin execution of the secondary virtual machine 102B from the last complete checkpoint.

According to embodiments of the disclosure, a checkpoint may be facilitated through buffering and tracking checkpoint information. When a checkpoint is generated for a virtual machine 102, checkpoint information may be captured and stored as partition state records 114 in a primary holding buffer 113A on the primary host 101A on which the primary virtual machine 102A is present. As will be discussed in more detail in FIG. 3, the partition state records 114 include tracking information and are associated with tracking structures on the primary host 101A. The primary host 101A transmits the partition state records 114 over a network 112 to a secondary holding buffer 113B on the secondary host 101B and the secondary host 101B acknowledges receipt of the received partition state records 114. If the secondary host 101B does not acknowledge receipt of the partition state records 114, the primary host 101B may retransmit the particular partition state records 114 that have not been received. The tracking information and structures associated with the partition state records 114 may enable the high availability system to transmit, retransmit, and assemble the partition state records out of sequence, among multiple secondary hosts 101B, and along different or parallel pathways through the network 112.

Packaging the checkpoint information into partition state records 114 may involve assigning a sequence number to each partition state record 114. This sequence number may be used for tracking the partition state record 114 through transmission and acknowledgement. By breaking the checkpoint information into partition state records 114 and tracking those partition state records 114, a high availability system may aggregate network bandwidth by sending the partition state records 114 out over multiple pathways. If any partition state records 114 are lost in transmission, the system can recognize which partition state records 114 were lost and retransmit the records. The partition state records 114 may also be tracked for transmission by particular pathways and for receipt by particular secondary hosts 101B, allowing for multiple secondary hosts 101B.

Checkpoint Structure

According to embodiments of the disclosure, a checkpoint-based high availability system packages and transmits checkpoint information using a tracking system. Checkpoint information of a virtual machine 102 operating on a primary host 101A is captured as a checkpoint and stored on a buffer on the primary host 101A. The checkpoint information of the virtual machine 102 is packaged into partition state records and transmitted to a secondary host 101B, where it is stored on a secondary holding buffer. The partition state records are associated with a sequence number, which may be associated with such tracking information as the order in which the partition state records have been generated, the communication pathways of the network 112 which the partition state record has been sent over, and the secondary hosts 101B which have acknowledged receipt of the partition state record.

Figure 2:
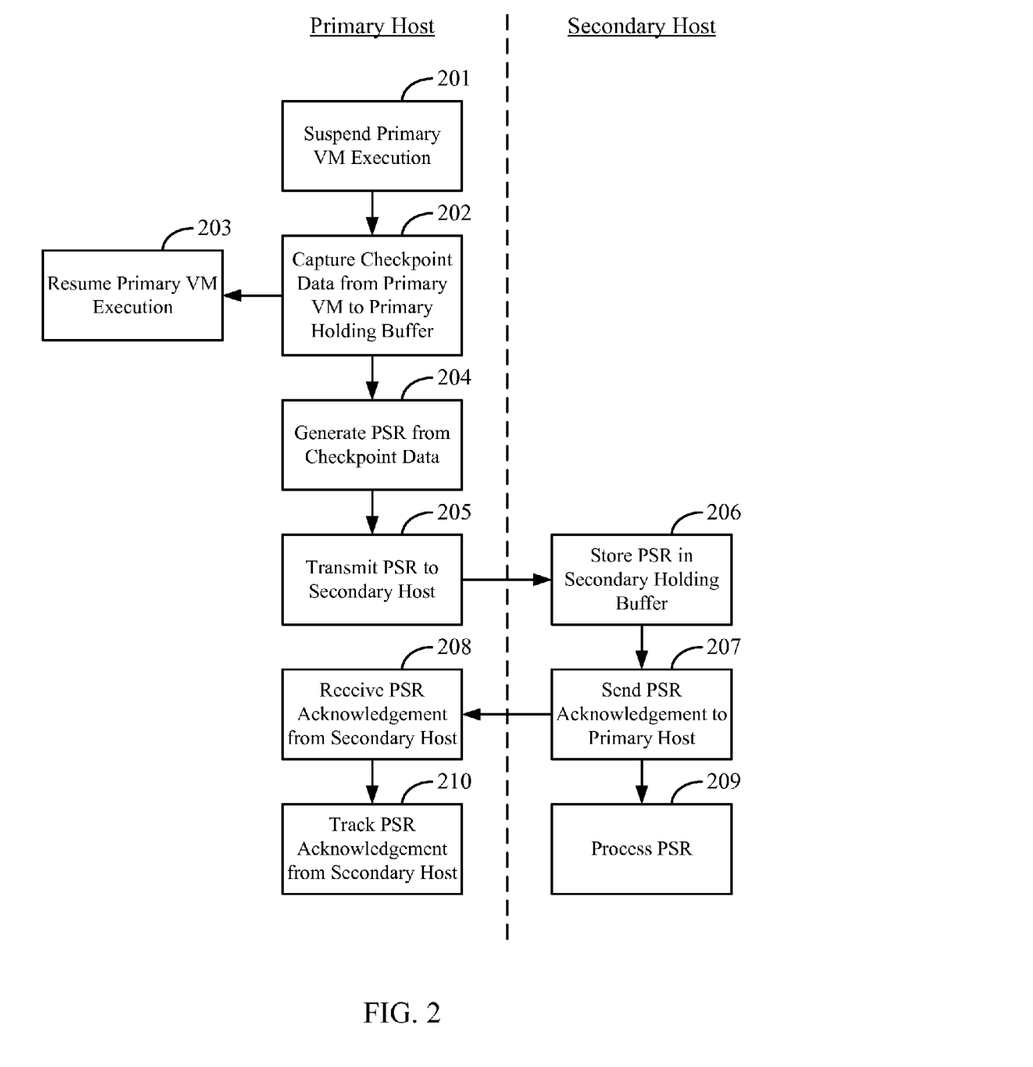
FIG. 2 is a diagram of a method for performing a checkpoint in a high availability system having a primary host and a secondary host, according to embodiments of the disclosure.

FIG. 2 illustrates one embodiment of a method for performing a checkpoint using the system of FIG. 1. In this embodiment, the primary host 101A running a primary virtual machine 102A suspends execution of the primary virtual machine 102A so that it can capture certain state information that may only be captured when the primary virtual machine 102A is suspended and unchanging, as in 201. The primary host 101A captures this suspended checkpoint data from the suspended primary virtual machine 102A into a primary holding buffer 113A, as in 202. Once the suspended checkpoint data is captured, the primary virtual machine 102A may resume execution, as in 203, while continuing to track memory pages modified since the last checkpoint but before the checkpoint information has been transmitted as checkpoint data. The primary hypervisor 103A or the primary checkpoint module 115A generates partition state records from the checkpoint data, as in 204, which may include tracking information for each partition state record.

Still referring to FIG. 2, the primary host transmits the partition state records 114 to a secondary host 101B, as in 205. The secondary host 101B receives the partition state records 114 and stores the partition state records 114 in a secondary holding buffer 113B on the secondary host 101B, as in 206. The secondary host 101B acknowledges receipt of the partition state records 114 to the primary host 101A, as in 207. The primary host 101A receives the acknowledgement from the secondary host 101B, as in 208, and may continue sending partition state records 114 until all partition state record 114 acknowledgements have been received or, if the transmission of the checkpoint is complete, send a checkpoint complete acknowledgement. Once the secondary host 101B has stored the entire checkpoint in its secondary holding buffer 113B, the secondary host 101B may process the state information and altered memory pages from the partition state records 114 and apply that checkpoint information to its secondary virtual machine 102B, as in 209. After receiving the acknowledgements for the partition state records 114, the primary host 101A may track the acknowledgements, as in 210, which may involve maintaining a tracking structure that associates an acknowledgement with a partition state record 114.

System Components

Figure 3:
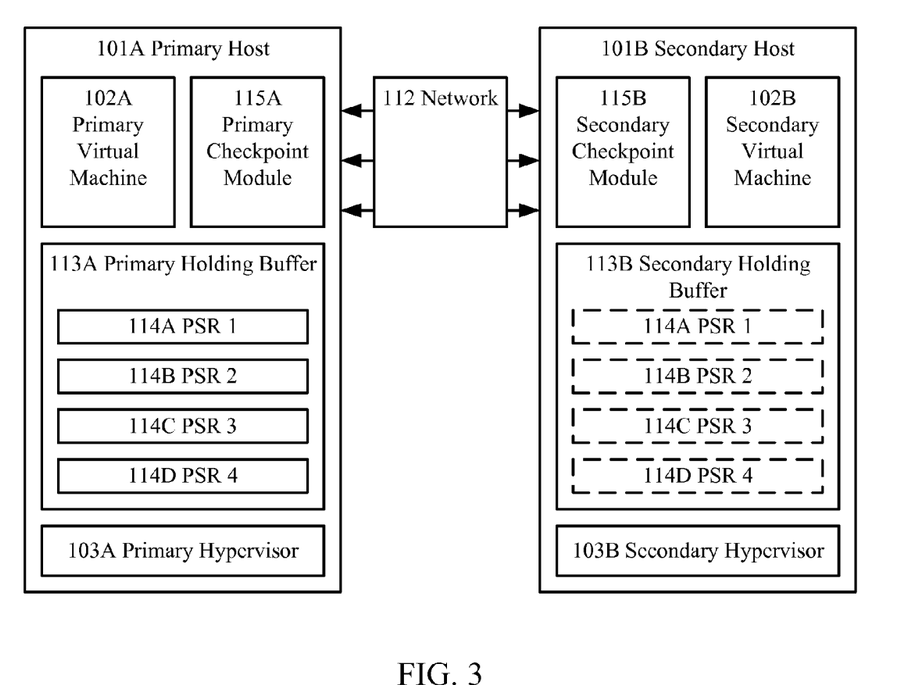
FIG. 3 is a diagram of a checkpoint high availability system that transmits checkpoint information as partition state records between a primary host and a secondary host, according to embodiments of the disclosure.

FIG. 3 is a diagram of a checkpoint high availability system embodiment that transmits checkpoint information as partition state records between a primary host 101A and a secondary host 101B, according to embodiments of the disclosure. The primary host 101A and the secondary host 101B each have a virtual machine 102, a hypervisor 103, a checkpoint module 115, and a holding buffer 113. Each holding buffer may store partition state records 114A, 114B, 114C, and 114D. The primary host 101A and secondary host 101B are connected through a network 112.

A high availability system may include a primary host 101A and one or more secondary hosts 101B. The primary and secondary hosts 101 may be data processing systems with processors, memory, and input/output resources, such as servers. The system configuration of the primary and secondary hosts 101 may be similar, even while their operation in the system is functionally different. The primary and secondary hosts 101 may be physically configured according to their failover conditions, and typically a primary and secondary host 101 will be physically and electrically separated for a loss of power failover condition. For systems requiring more robust high availability, more than one secondary host 101B may be part of the system. While the primary and secondary hosts 101 may be described in terms of specific functions, they may be configured to perform the functions of the other due to their failover function.

Each primary and secondary host 101 may have a hypervisor 103 (or virtual machine manager) installed as firmware or software. The hypervisor 103 may be installed directly on the hardware (type 1 hypervisor), such as on firmware or system memory, or may be installed on an operating system (type 2 hypervisor). The hypervisor 103 controls, manages the interactions between, and allocates physical resources to the virtual machines 102 abstracted on to its host machine 101.

The primary and secondary hypervisors 103 of the primary and secondary hosts 101 may abstract a virtual machine 102 onto the hardware of their respective hosts 101. A virtual machine 102 is a software implementation of a physical machine that may execute instructions like a physical machine. A primary virtual machine 102A abstracted onto the primary host 101A by a primary hypervisor 103A may execute instructions and consume processor resources running applications. The secondary virtual machine 102B abstracted onto the secondary host 101B by a secondary hypervisor 103B may receive state and memory page updates through checkpoints, but may not execute instructions until a failover has occurred and control has transferred to the secondary host 101B.

The primary and secondary hosts 101 may each have a checkpoint module 115 for performing checkpoint operations. A checkpoint module 115 may be firmware, logic, or an abstraction of hardware resources for interfacing, managing communications, and transferring checkpoint information between the primary and secondary hosts. The checkpoint module 115 is a functional unit defined by its operation, and may be spread across multiple components and units. If the checkpoint module 115 is a checkpoint partition abstracted by a hypervisor 103, the hypervisor 103 may interface with the checkpoint partitions through interfaces such as virtual asynchronous services interface.

The primary checkpoint module 115A may include logic for transmitting and tracking the partition state records. The primary checkpoint module 115A may contain data structures associated with a partition state record that: associate the partition state record's sequence number with the component source of the partition state record's checkpoint information; track the secondary hosts 101B that have acknowledged receipt of the partition state record; track the communication pathways over which the partition state record has been transmitted; and account for the order in which the partition state records have been generated so that the state information can be reconstructed on the secondary host 101B. The secondary checkpoint module 115B may include logic for receiving and acknowledging receipt of the partition state records and placing the partition state records in sequence for application to the secondary virtual machine.

Each primary and secondary host may include a holding buffer 113. The holding buffer 113 is an allocation of memory used to store and buffer checkpoint information. The primary holding buffer 113A on the primary host 101A stores checkpoint information, such as processor state and memory pages, from the primary virtual machine 102A during suspended and speculative execution and buffers the checkpoint information for transmission to the secondary host 101B. The secondary holding buffer 113B on a secondary host 101B buffers incoming checkpoint information to be applied to a secondary virtual machine 102B. The holding buffers 113 may be allocated by the respective primary and secondary hypervisor 103 during partitioning of the virtual machine 102, and may be part of the hypervisor memory.

The holding buffers 113 may be configured to hold the contents of a checkpoint. The primary holding buffer 113A may be sized to accommodate the primary host's 101A suspended state information (state information captured when the virtual machines execution is suspended) and I/O entitlement (memory pages). The state information may change depending on the partition configuration of the system, such as number of virtual processors, memory, and virtual I/O adapters. The secondary holding buffer 113B may be a different size than the primary holding buffer 113A; however, due to failover, it may typically be the same size, as it will take over primary virtual machine 102A operation. During a checkpoint, space in the holding buffer 113 may be reserved by state reservations and memory reservations, according to the size of the holding buffer 113.

The checkpoint information of partition state records 114A, 114B, 114C, and 114D may include processor state changes and memory page updates. The checkpoint information of a partition state record may include, but is not limited to, virtual processor state, register state, interrupt state, time-of-day state, virtual I/O slot state, partition management state, co-processor state, and dirty memory pages.

The primary and secondary hosts may be connected through and in communication with a network 112. The network 112 may include multiple networks, such as a local area network between hosts in the system, a local area network between hosts and clients, and a storage area network between hosts and storage devices. The network 112 may also contain multiple network pathways through which partition state records may be transmitted. During a checkpoint, the network and storage write traffic may be buffered, to be released after the checkpoint is complete.

Checkpoint Method

Figure 4:
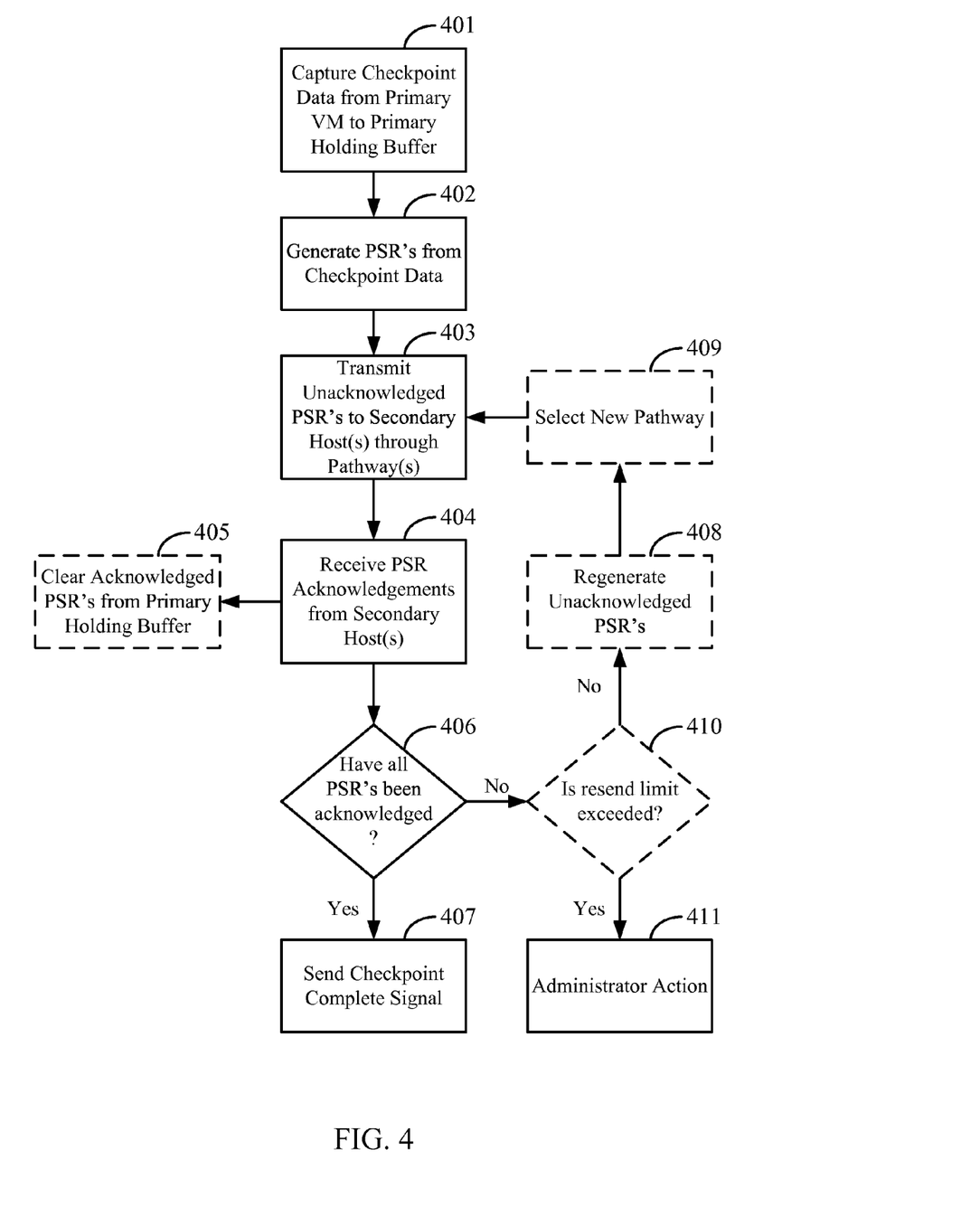
FIG. 4 is a flowchart of a method for transmitting checkpoint information from a primary host to one or more secondary hosts, according to embodiments of the disclosure.
Figure 5:
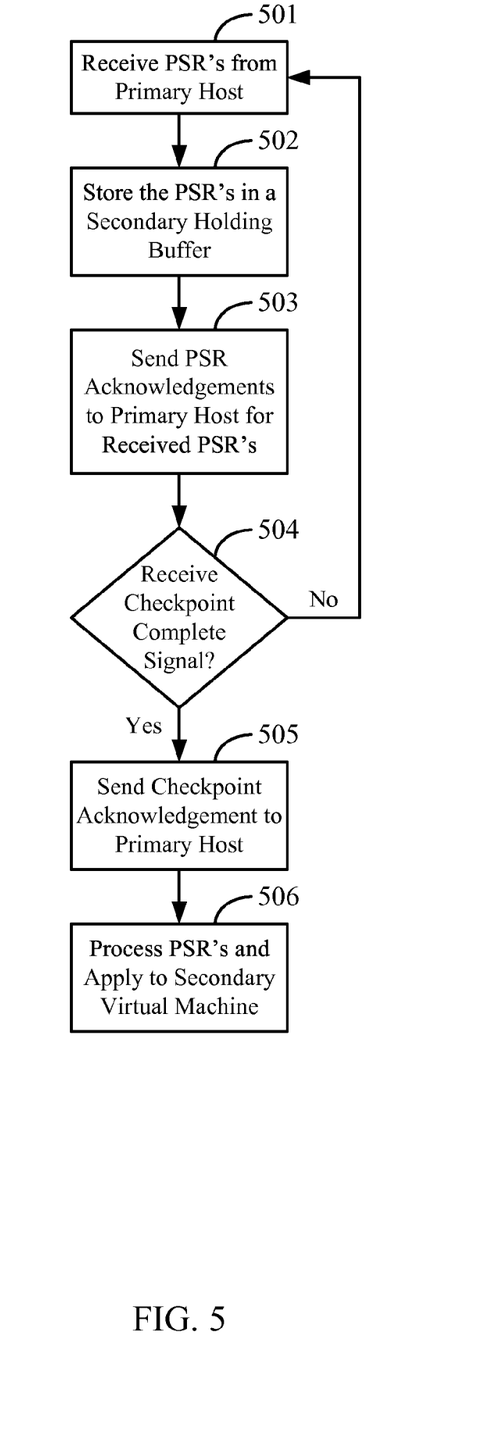
FIG. 5 is a flowchart of a method for receiving checkpoint information by a secondary host from a primary host, according to embodiments of the disclosure.

FIG. 4 is a flowchart of a method for transmitting checkpoint data by a primary host to a secondary host in a high availability system, according to embodiments of the disclosure. FIG. 5 is a flowchart of a method for receiving checkpoint data by the secondary host from the primary host in a high availability system, according to embodiments of the disclosure. FIG. 4 and FIG. 5 may refer to different parts of a checkpoint operation, where FIG. 4 addresses those parts by the primary host and FIG. 5 addresses those parts by the secondary host.

Referring to FIG. 4, a primary host may perform a checkpoint for a primary virtual machine when the primary host reaches the scheduled time for a primary checkpoint. A primary hypervisor captures checkpoint data from a primary virtual machine on the primary host, as in 401. The checkpoint data includes processor state from the virtualized processor and memory pages from the virtualized memory. The primary hypervisor ends the checkpoint interval by suspending execution of the primary virtual machine. The primary hypervisor continues to buffer any sent network packets and disk modifying operations and track memory pages modified by the virtual machine since the previous checkpoint. Once the primary virtual machine is stopped, the primary hypervisor may collect the remaining state of the primary virtual machine that cannot be captured until the virtual machine is suspended. The checkpoint data captured is stored in a primary holding buffer of the primary host. When all the checkpoint information has been captured, the primary virtual machine may continue speculative execution, while continuing to buffer network traffic and storage writes until the checkpoint is complete.

The primary hypervisor generates partition state records from the checkpoint data, as in 402. The partition state records may be generated after the checkpoint data has been captured according to a specific order that allows the secondary host to reconstruct the checkpoint information from the partition state records. Each partition state record includes tracking information that allows checkpoint logic or partitions on the primary host to track the transmission and acknowledgement of the partition state records by the secondary host.

The partition state records are transmitted to the secondary host, as in 403. The partition state records may be transmitted along different pathways to aggregate bandwidth and transmit the partition state records faster. The primary checkpoint module on the primary host may associate the sequence number of a partition state record transmitted with the pathway over which it was transmitted.

Referring to FIG. 5, the secondary host may receive partition state records from the primary host, as in 501. The secondary host may store the partition state records in a secondary holding buffer, as in 502. The secondary host may place the partition state records into the secondary holding buffer in the order dictated by the sequence numbers of the partition state records, to allow for reconstruction of the checkpoint information.

The secondary host may send acknowledgements for any partition state records received from the primary host, as in 503. The acknowledgements may be sent to the primary host and may include the sequence number of each partition state record. Alternatively, the secondary host may acknowledge a contiguous sequence of partition state records. When the secondary host receives a set interval of contiguous partition state records, which may be determined from their sequence numbers, the secondary host sends an acknowledgement to the primary host. The acknowledgement may contain the last sequence number of the contiguous interval. If the secondary host has not received the interval of contiguous sequence numbers, it may continue to accept incoming partition state records from the primary host.

Referring back to FIG. 4, the primary host tracks the acknowledgments of partition state records from the secondary hosts, as in 404. The acknowledgements may include the sequence number of the partition state records received or, if acknowledged in intervals, the last sequence number of the successfully sent interval of partition state records. Once a partition state record has been acknowledged by all secondary hosts, it may be removed from the primary holding buffer to make room for other partition state records, such as dirty memory pages, as in 405.

When the primary host transmits partition state records, it may start a transmission timer. When the transmission timer expires, the primary host may determine any unacknowledged partition state records, as in 406. If there are no unacknowledged partition state records, the primary host may send a checkpoint complete signal to the secondary host, as in 407. If there are any unacknowledged partition state records, the primary host may retransmit the partition state records. Alternatively, if an interval acknowledgement is used and there are gaps in the interval of acknowledgements, the primary host may roll back to the last successfully transmitted sequence numbers and retransmit the unacknowledged partition state records to the secondary host. If the unacknowledged partition state records have been removed from the primary holding buffer, they may be regenerated, as in 408. The primary host may associate a particular partition state record with checkpoint information from particular components, to assist in regeneration of the partition state record.

Additionally, the primary host may retransmit the previously lost partition state records through a new pathway, if multiple pathways exist, as in 409. The primary host may associate a pathway identifier with a particular pathway and track the sequence number of the partition state record sent along that pathway. If the partition state record is lost through one pathway, or if the pathway has been unreliable for transmission, the primary host may retransmit the partition state record through an alternative pathway.

To limit the number of retransmissions, the primary host may have a retransmission threshold, as in 410. A retransmission counter may be incremented with every transmission of the partition state records. The retransmission counter may be compared to the retransmission threshold. If the retransmission threshold is exceeded, it may cause the primary host to perform an administrative action, as in 411. The administrative action may include stopping checkpoint transmission and continuing execution of the primary virtual machine without high availability protection or removal of the offending secondary host from the pool of failover hosts. The retransmission threshold may be a number of attempts or a set amount of time.

Referring back to FIG. 5, the secondary host may continue to receive partition state records until a checkpoint complete signal has been received from the primary host, as in 504. In response to a checkpoint complete signal being received, the secondary host may send a checkpoint acknowledgement to the primary host, as in 505. Once the secondary host has received the checkpoint complete signal, it may start to process the partition state records and apply the checkpoint information to the secondary virtual machine, as in 506.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but is not limited to, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium including, but not limited to, wireless, wire line, optical fiber cable, RF, etc., or any suitable combination of the foregoing.

Computer program code for carrying out operations for aspects of the present disclosure may be written in any combination of one or more programming languages, including an object-oriented language such as Java, Smalltalk, C++, or the like, and conventional procedural programming languages, such as "C" programming language or similar programming languages. The program code may execute entirely on the user's computer, partly on the user's computer, as a standalone software package, partly on the user's computer and partly on a remote computer or server, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:
1. A high availability system, comprising:
a primary host having:
  a primary hypervisor;
  a primary virtual machine abstracted by the primary hypervisor;
  a primary holding buffer of memory configured to store checkpoint information from the primary virtual machine as partition state records, wherein the checkpoint information includes one or more of a virtual processor state, a register state, an interrupt state, a time-of-day state, a virtual I/O slot state, and a partition management state; and
  a primary checkpoint module configured to:
    suspend operation of the primary virtual machine to generate a first number of partition state records from the checkpoint information;
    resume operation of the primary virtual machine after generating the partition state records;
    assign respective sequence numbers to each of the partition state records;

transmit all of the partition state records to each of a plurality of secondary hosts after resuming operation of the primary virtual machine;

receive acknowledgements from each of the plurality of secondary hosts for a respective second number of partition state records;

track the second number of partition state records acknowledged by each of the plurality of secondary hosts based on the respective sequence numbers, wherein each respective sequence number is associated with tracking information including an order in which the partition state records were generated and respective communication pathways over which the respective partition state records are sent to each of the plurality of secondary hosts;

each of the plurality of secondary hosts having:
a secondary hypervisor;
a secondary virtual machine abstracted by the secondary hypervisor;
a secondary holding buffer of memory configured to store the partition state records; and
a secondary checkpoint module configured to:
receive the partition state records; and
transmit acknowledgements of the partition state records received; and a network connecting the primary host and each of the plurality of secondary hosts in communication, wherein the network has more than one communication pathway between the primary host and each of the plurality of secondary hosts;

wherein the primary checkpoint module is further configured to send a checkpoint complete signal to each of the plurality of secondary hosts once transmission of the partition state records is complete;

wherein the secondary checkpoint module is further configured to start processing the received partition state records stored in the secondary holding buffer in response to receiving the checkpoint complete signal;

wherein the primary checkpoint module is further configured to remove each respective partition state record from the primary holding buffer once acknowledgement of the respective partition state record has been received from all of the plurality of secondary hosts;

wherein the primary checkpoint module is further configured to start a transmission timer in response to transmitting the first number of partition state records to each of the plurality of secondary hosts;

wherein, in response to the transmission timer expiring, the primary checkpoint module is further configured to identify one or more unacknowledged partition state records based on acknowledgments from an offending secondary host of the plurality of secondary hosts;

wherein the primary checkpoint module is configured to compare a retransmission counter to a retransmission threshold in response to identifying one or more unacknowledged partition state records based on the acknowledgments from the offending secondary host, wherein the one or more unacknowledged partition state records are identified by their respective sequence numbers;

wherein the primary checkpoint module is configured to retransmit each unacknowledged partition state record to the offending secondary host over a different communication pathway and increment the retransmission counter in response to determining that the retransmission counter does not exceed the retransmission threshold;

wherein the primary checkpoint module is configured to stop transmission of the unacknowledged partition state records and remove the offending secondary host from the plurality of secondary hosts in response to determining that the retransmission counter exceeds the retransmission threshold.

2. The system of claim 1, wherein the primary checkpoint module is further configured to:
assign sequence numbers to the partition state records; and
track acknowledgements of the partition state records using the sequence numbers.

3. The system of claim 1, wherein the primary checkpoint module is further configured to track a pathway over which each partition state record has been transmitted using a sequence number of the partition state record.

4. The system of claim 1, wherein the primary checkpoint module is further configured to assign sequence numbers to the partition state records and transmit the partition state records to the secondary host across the more than one communication pathway to aggregate network bandwidth; and wherein the secondary checkpoint module is further configured to re-assemble the received partition state records in an order based on the assigned sequence numbers.

5. A host of a high availability system, the host comprising:
a memory;
a holding buffer; and
a processing unit coupled to the memory and the holding buffer;
wherein the processing unit is configured to implement a virtual machine comprising a virtual processing unit abstracted from the processing unit and a virtual memory abstracted from the memory;
wherein the processing unit is configured to suspend execution of the virtual machine and to capture checkpoint information for the virtual machine while execution of the virtual machine is suspended, wherein the checkpoint information includes one or more of a virtual processor state, a register state, an interrupt state, a time-of-day state, a virtual I/O slot state, and a partition management state;
wherein the processing unit is further configured to package the checkpoint information into partition state records and to store the partition state records in the holding buffer;
wherein, after capturing the checkpoint information, the processing unit is further configured to resume execution of the virtual machine and to transmit all of the partition state records from the holding buffer after resuming execution of the virtual machine to each of a plurality of failover hosts, each failover host configured to implement a second virtual machine and store the partition state records in a second holding buffer until receiving a checkpoint complete signal;
wherein the processing unit is further configured to assign respective sequence numbers to each of the partition state records, receive acknowledgements from each of the plurality of failover hosts, and track the partition state records acknowledged by the plurality of failover hosts based on the respective sequence numbers;

wherein each respective sequence number is associated with tracking information including an order in which the partition state records were generated and respective communication pathways over which the respective partition state records are sent to each of the plurality of secondary hosts;

wherein the processing unit is further configured to send the checkpoint complete signal to each of the plurality of failover hosts once transmission of the partition state records is complete, the checkpoint complete signal indicating to each of the plurality of failover hosts that the checkpoint information in the partition state records can be applied to the second virtual machine;

wherein the processing unit is further configured to remove each respective partition state record from the primary holding buffer once acknowledgement of the respective partition state record has been received from all of the plurality of failover hosts;

wherein the primary checkpoint module is further configured to start a transmission timer in response to transmitting the first number of partition state records to each of the plurality of failover hosts;

wherein, in response to the transmission timer expiring, the primary checkpoint module is further configured to identify one or more unacknowledged partition state records based on acknowledgments from an offending failover host of the plurality of failover hosts;

wherein the processing unit is configured to compare a retransmission counter to a retransmission threshold in response to identifying one or more unacknowledged partition state records based on the acknowledgments from the offending failover host, wherein the one or more unacknowledged partition state records are identified by their respective sequence numbers;

wherein the processing unit is configured to retransmit each unacknowledged partition state record to the offending failover host over a different communication pathway and increment the retransmission counter in response to determining that the retransmission counter does not exceed the retransmission threshold;

wherein the processing unit is configured to stop transmission of the unacknowledged partition state records and remove the offending failover host from the plurality of failover hosts in response to determining that the retransmission counter exceeds the retransmission threshold.

6. The host of claim 5, wherein the processing unit is further configured to:
assign sequence numbers to the partition state records; and
track acknowledgements of the partition state records using the sequence numbers.

7. The host of claim 5, wherein the processing unit is further configured to assign sequence numbers to the partition state records and transmit the partition state records to the at least one failover host across a plurality of communication pathways to aggregate network bandwidth;
wherein the assigned sequence numbers are used by the at least one failover host to re-assemble the partition state records in a specified order.

* * * * *